United States Patent
Terashima et al.

(10) Patent No.: US 12,104,216 B2
(45) Date of Patent: *Oct. 1, 2024

(54) ANNEALING SEPARATOR FOR GRAIN-ORIENTED ELECTRICAL STEEL SHEET AND METHOD OF PRODUCING GRAIN-ORIENTED ELECTRICAL STEEL SHEET

(71) Applicant: JFE STEEL CORPORATION, Tokyo (JP)

(72) Inventors: Takashi Terashima, Tokyo (JP); Makoto Watanabe, Tokyo (JP); Toshito Takamiya, Tokyo (JP); Karin Kokufu, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 614 days.

This patent is subject to a terminal disclaimer.

(21) Appl. No.: 17/417,375

(22) PCT Filed: Dec. 26, 2019

(86) PCT No.: PCT/JP2019/051318
§ 371 (c)(1),
(2) Date: Jun. 23, 2021

(87) PCT Pub. No.: WO2020/138373
PCT Pub. Date: Jul. 2, 2020

(65) Prior Publication Data
US 2022/0074012 A1 Mar. 10, 2022

(30) Foreign Application Priority Data
Dec. 27, 2018 (JP) .................. 2018-246167

(51) Int. Cl.
| | |
|---|---|
| *C21D 9/46* | (2006.01) |
| *C21D 6/00* | (2006.01) |
| *C21D 8/00* | (2006.01) |
| *C21D 8/12* | (2006.01) |
| *C22C 38/00* | (2006.01) |
| *C22C 38/02* | (2006.01) |
| *C22C 38/04* | (2006.01) |
| *C22C 38/06* | (2006.01) |
| *H01F 1/147* | (2006.01) |

(52) U.S. Cl.
CPC .............. *C21D 9/46* (2013.01); *C21D 6/005* (2013.01); *C21D 6/008* (2013.01); *C21D 8/005* (2013.01); *C21D 8/1222* (2013.01); *C21D 8/1233* (2013.01); *C21D 8/1272* (2013.01); *C22C 38/001* (2013.01); *C22C 38/02* (2013.01); *C22C 38/04* (2013.01); *C22C 38/06* (2013.01); *H01F 1/147* (2013.01); *C22C 2202/02* (2013.01)

(58) Field of Classification Search
None
See application file for complete search history.

(56) References Cited

U.S. PATENT DOCUMENTS

| | | | |
|---|---|---|---|
| 4,242,155 A | 12/1980 | Morito et al. | |
| 4,287,006 A | 9/1981 | Hiromae et al. | |
| 5,863,356 A | 1/1999 | Fritz et al. | |
| 9,194,016 B2 | 11/2015 | Okubo et al. | |
| 9,805,851 B2 | 10/2017 | Watanabe et al. | |
| 10,610,964 B2 | 4/2020 | Arai et al. | |
| 11,174,526 B2 | 11/2021 | Shingaki et al. | |
| 11,186,888 B2 | 11/2021 | Imamura et al. | |
| 2011/0192322 A1* | 8/2011 | Lamminmaki | C09C 1/3623 |
| | | | 106/447 |
| 2014/0246124 A1 | 9/2014 | Okubo et al. | |
| 2016/0089860 A1 | 3/2016 | Kurosaki et al. | |
| 2018/0202018 A1* | 7/2018 | Imamura | C21D 8/1272 |
| 2022/0074012 A1 | 3/2022 | Terashima et al. | |

FOREIGN PATENT DOCUMENTS

| | | |
|---|---|---|
| BR | 112016025466-0 A2 | 8/2017 |
| CN | 103857827 A | 6/2014 |
| CN | 103890211 A | 6/2014 |
| CN | 107109563 A | 8/2017 |
| CN | 107849656 A | 3/2018 |
| DE | 4409691 A1 | 9/1995 |

(Continued)

OTHER PUBLICATIONS

Machine Translation of JP-2011231368-A (Year: 2011).*
Machine Translation of JPH-09194948-A (Year: 1997).*
Mar. 24, 2020, International Search Report issued in the International Patent Application No. PCT/JP2019/051318.
Jul. 1, 2022, Office Action issued by the China National Intellectual Property Administration in the corresponding Chinese Patent Application No. 201980086106.9 with English language search report.
Jan. 12, 2022, the Extended European Search Report issued by the European Patent Office in the corresponding European Patent Application No. 19903909.0.

*Primary Examiner* — Keith Walker
*Assistant Examiner* — Ryan L Heckman
(74) *Attorney, Agent, or Firm* — KENJA IP LAW PC

(57) ABSTRACT

Provided is an annealing separator with which a grain-oriented electrical steel sheet having a forsterite film with excellent appearance uniformity and adhesion can be obtained. The annealing separator for grain-oriented electrical steel sheet comprises: magnesia that contains 0.05 mass % or more and 0.20 mass % or less of B and 0.01 mass % or more and 0.10 mass % or less of P, and titanium oxide in 1.0 part by mass or more and 10.0 parts by mass or less per 100 parts by mass of the magnesia where the titanium oxide contains one or more types of alkali metals in a total amount of 0.0050 mass % or more and 0.50 mass % or less, where an amount of P adsorbed on per 1 g of the titanium oxide is $1.5 \times 10^{-4}$ g or more and $1.0 \times 10^{-3}$ g or less.

6 Claims, No Drawings

(56) References Cited

FOREIGN PATENT DOCUMENTS

| | | | |
|---|---|---|---|
| EP | 0525467 | A2 | 2/1993 |
| JP | S54143718 | A | 11/1979 |
| JP | S55164025 | A | 12/1980 |
| JP | S62156227 | A | 7/1987 |
| JP | H-09194948 | A * | 7/1997 |
| JP | H09510503 | A | 10/1997 |
| JP | 2001192737 | A | 7/2001 |
| JP | 2004238668 | A | 8/2004 |
| JP | 2006274394 | A | 10/2006 |
| JP | 2007247022 | A | 9/2007 |
| JP | 2011231368 | A * | 11/2011 |
| JP | 2016145419 | A | 8/2016 |
| JP | 2017128773 | A | 7/2017 |
| WO | 2015170755 | A1 | 11/2015 |

* cited by examiner

ANNEALING SEPARATOR FOR GRAIN-ORIENTED ELECTRICAL STEEL SHEET AND METHOD OF PRODUCING GRAIN-ORIENTED ELECTRICAL STEEL SHEET

TECHNICAL FIELD

This disclosure relates to an annealing separator with which a grain-oriented electrical steel sheet having a forsterite film with excellent appearance uniformity and adhesion can be obtained, and to a method of producing a grain-oriented electrical steel sheet using the annealing separator.

BACKGROUND

A grain-oriented electrical steel sheet is generally produced by subjecting a steel slab, which has been adjusted to a predetermined chemical composition, to hot rolling and to cold rolling either once, or twice or more with intermediate annealing performed therebetween, and then to primary recrystallization annealing, followed by final annealing including secondary recrystallization annealing and purification annealing. In the final annealing, since the steel sheet is annealed at a high temperature of about 1200° C. in coil form, the coiled steel sheets may stick together. Therefore, it is common practice to apply an annealing separator to the surface of the steel sheet, and subject the steel sheet to secondary recrystallization annealing and then continuously to purification annealing, thereby preventing the steel sheets from sticking together. An annealing separator is generally based on magnesia, and it is hydrated to form a slurry and then applied to a surface of a steel sheet.

In addition to its role as an annealing separator, magnesia also has the function of reacting with a silica-based oxidation layer formed on a surface of a steel sheet by primary recrystallization annealing to form a film of forsterite ($Mg_2SiO_4$) (hereinafter, also referred to as forsterite film). The forsterite film thus formed have functions of, for example, acting as a kind of binder that adheres an overcoated phosphate-based insulating coating to the steel substrate of the steel sheet, improving the magnetic properties of the steel sheet by applying tension to the steel sheet, and making the appearance of the steel sheet uniform. As described above, the quality of magnesia in the annealing separator is an important factor that influences the magnetic properties and film properties of a grain-oriented electrical steel sheet.

For this reason, various measures have been taken to improve the quality of conventional magnesia. For example, JP 2004-238668 A (PTL 1) describes a technique of setting phosphorus contained in magnesia to 0.03 mass % to 0.15 mass % in terms of $P_2O_3$ and setting a molar ratio with phosphorus and sulfur of Ca/(Si+P+S) to 0.7 to 3.0 to improve the ability of magnesia to form a forsterite film.

In addition, techniques of adding various compounds to an annealing separator have also been proposed. For example, JP 2011-231368 A (PTL 2) describes a technique of adding B and P to an annealing separator to promote a solid state reaction between magnesia and silica, thereby obtaining a forsterite film with uniform appearance. JP S54-143718 A (PTL 3) describes a technique using Sr compounds, and JP S62-156227 A (PTL 4) describes a technique using B compounds, S compounds, and Ti compounds. Further, J P 2001-192737 A (PTL 5) describes a technique using $TiO_2$ where the surface has been treated with one or more of compounds of Ca, Sr, Ba, Zr, V, Cr, Mn, Fe, Co, Cu, Zn, Al, B, Si, Sn, P, Bi, Sb and B.

CITATION LIST

Patent Literature

PTL 1: JP 2004-238668 A
PTL 2: JP 2011-231368 A
PTL 3: JP S54-143718 A
PTL 4: JP S62-156227 A
PTL 5: JP 2001-192737 A

SUMMARY

Technical Problem

In recent years, more stringent requirements have been placed on the properties (particularly low iron loss) of electrical steel sheets from the viewpoint of energy saving. Examples of methods of achieving low iron loss include a method of reducing the thickness of the steel sheet and a method of controlling the orientation of secondary recrystallized grains with higher accuracy, but all of them are likely to deteriorate the appearance uniformity and adhesion of a film. Therefore, there is an even greater demand for an annealing separator capable of forming a forsterite film having excellent appearance uniformity and adhesion even when such a method of achieving low iron loss is applied.

Particularly in a case where the thickness of a forsterite film is reduced to reduce the thickness of a steel sheet, it is clear that the uniformity and adhesion of the forsterite film cannot be fully satisfied with the techniques described in the above patent literatures.

It could thus be helpful to provide an annealing separator with which a grain-oriented electrical steel sheet having a forsterite film with excellent appearance uniformity and adhesion can be obtained.

Solution to Problem

The invention described in PTL 2 is a technique of containing B in magnesia to improve the film reactivity at high temperatures and adding P to an annealing separator to promote the film reaction at low temperatures. Based on the technique described in PTL 2, we have diligently studied a method of further improving the film reaction promoting properties of $TiO_2$ at high temperatures.

As a result, we found that
1. the film reaction promoting properties of $TiO_2$ at high temperatures can be controlled by a content of alkali metal in titanium oxide;
2. when P is adsorbed on the surface of titanium oxide, the film reaction promoting properties are impaired; and
3. therefore, it is necessary to properly adjust the content of alkali metal in titanium oxide and the amount of P adsorbed on per 1 g of titanium oxide in order to obtain good film appearance.

The present disclosure is based on the above findings.
We thus provide:
(1) An annealing separator for grain-oriented electrical steel sheet, comprising:
magnesia that contains 0.05 mass % or more and 0.20 mass % or less of B and 0.01 mass % or more and 0.10 mass % or less of P and is mainly composed of MgO, and titanium oxide in 1.0 part by mass or more and 10.0 parts by mass or less per 100 parts by mass of the magnesia, where the titanium oxide contains one or more types of alkali metals in a total amount of 0.0050 mass % or more and 0.50 mass % or less and is mainly composed of $TiO_2$, wherein an amount of P adsorbed on per 1 g of the titanium oxide is $1.5\times10^{-4}$ g or more and $1.0\times10^{-3}$ g or less.

(2) The annealing separator for grain-oriented electrical steel sheet according to (1), wherein the $TiO_2$ is anatase-type $TiO_2$.

(3) A method of producing a grain-oriented electrical steel sheet, comprising subjecting a steel slab to hot rolling to obtain a hot-rolled steel sheet, subjecting the hot-rolled steel sheet to cold rolling either once, or twice or more with intermediate annealing performed therebetween to obtain a cold-rolled steel sheet with a final sheet thickness, then subjecting the cold-rolled steel sheet to primary recrystallization annealing to obtain a primary recrystallized sheet, and then an annealing separator is applied to a surface of the primary recrystallized sheet, and then the primary recrystallized sheet is subjected to secondary recrystallization annealing to obtain a secondary recrystallized sheet, wherein the annealing separator is the annealing separator according to (1) or (2).

(4) The method of producing a grain-oriented electrical steel sheet according to (3), wherein in the secondary recrystallization annealing, the sheet is held in a temperature range of 800° C. or higher and 950° C. or lower for 5 hours or longer and 200 hours or shorter.

Advantageous Effect

According to the present disclosure, it is possible to provide an annealing separator with which a grain-oriented electrical steel sheet having a forsterite film with excellent appearance uniformity and adhesion can be obtained.

DETAILED DESCRIPTION

The following describes the present disclosure in detail.

First, the findings that led to the completion of the present disclosure will be described in detail.

A forsterite film and a phosphate-based insulating coating are usually formed on a surface of a grain-oriented electrical steel sheet from the surface of the steel sheet to the outside. The forsterite film is formed by a reaction of an oxide film mainly composed of $SiO_2$ formed during primary recrystallization annealing and MgO contained in an annealing separator applied on the oxide film, as indicated in the following formula.

$$2MgO + SiO_2 \rightarrow Mg_2SiO_4$$

It is known that the forsterite film reaction consists of two steps in each annealing temperature range as follows.

1) Low Temperature Range (Lower than 1100° C.)

Step of forming olivine $((Fe_{1-x}Mg_x)_2SiO_4)$ by replacing Fe in fayalite $(Fe_2SiO_4)$ formed on the surface of the steel sheet because of the moisture in the annealing separator slurry with Mg by a reaction with magnesia $$Fe_2SiO_4 + 2xMgO \rightarrow (Fe_{1-x}Mg_x)_2SiO_4 + 2xFeO$$

2) High Temperature Range (1100° C. or Higher)

Step of forming forsterite by direct reaction of $SiO_2$ and MgO $$2MgO + SiO_2 \rightarrow Mg_2SiO_4$$

The progress of the reaction in the low temperature range can be confirmed by Fourier transform infrared spectroscopy (FT-IR) of the surface of the steel sheet. That is, the larger the amount of Mg in olivine is, the more the peak position (wave number) of absorbance shifts to a high-wave number side, and therefore it can be judged that the more the peak position shifts to a high-wave number side, the higher the film reactivity is in the low temperature range. Further, the film reactivity in the high temperature range can be evaluated by extracting the oxide formed on the surface of the steel sheet which has been annealed at a heating rate of 10° C./h up to 1200° C., and analyzing the amount of forsterite formed using FT-IR.

We applied an annealing separator, which had been prepared by blending various elements with magnesia containing an appropriate amount of P and B, to a steel sheet after primary recrystallization annealing to evaluate the film reactivity in the low temperature range and in the high temperature range. As a result, it was found that the film reaction was promoted especially in the high temperature range and the appearance uniformity and adhesion of the forsterite film were improved by using an annealing separator obtained by blending titanium oxide that contains an appropriate amount of alkali metal and has an appropriate amount of P adsorbed on per 1 g of titanium oxide with magnesia that contains an appropriate amount of P and B.

The mechanism, by which the appearance uniformity and adhesion of the forsterite film are improved by using an annealing separator obtained by blending titanium oxide that contains an appropriate amount of alkali metal and has an appropriate amount of P adsorption with magnesia that contains an appropriate amount of P and B, has not yet been clarified. However, we infer as follows.

MgO reacts with $TiO_2$ in the low temperature range to form double oxides such as $MgTiO_3$, $Mg_2TiO_4$, and $MgTi_2O_4$. These double oxides act like a catalyst in the above-mentioned solid-phase reaction of MgO and $SiO_2$ in the high temperature range, thereby increasing the amount of forsterite formed. At this time, if magnesia contains an appropriate amount of P, lattice defects are introduced into MgO crystal. As a result, the solid-phase reactivity between MgO and $TiO_2$ is enhanced.

Further, as described in PTL 2, silica and magnesia directly react in a solid phase in high temperature ranges, so that the silica needs to move to the surface of the steel sheet in order to form forsterite. Because the silica formed on the surface layer of the steel sheet is amorphous (vitrified), its viscosity decreases at high temperatures, rendering it easy to move to the surface of the steel sheet. At this time, if B is incorporated into the silica glass, the viscosity is further reduced, and the silica moves to the surface of the steel sheet smoothly. As a result, the reaction with magnesia is promoted, and the amount of forsterite formed is increased.

Therefore, it is considered that the amount of forsterite formed in the high temperature range can be increased by using magnesia containing an appropriate amount of P and B.

Moreover, during the solid-phase reaction between MgO and $TiO_2$ at high temperatures, P on the surface of magnesia acts on the surface of titanium oxide to promote the movement of atoms on the surface of titanium oxide, which in turn enhances the solid-phase reactivity between MgO and $TiO_2$. To promote the movement of atoms, the surface of titanium oxide needs to be in a state where P is easily adsorbed. At this time, if alkali metal elements such as Na and K are excessively present in titanium oxide, the reaction is over-promoted because the effect of promoting the solid-phase reaction between MgO and $TiO_2$ by P in magnesia and the effect of promoting the solid-phase reaction between MgO and $TiO_2$ by alkali metal elements such as Na and K are added together, which may cause problems such as film defects. Therefore, it is considered that, by containing an appropriate amount of alkali metal in titanium oxide and properly adjusting the amount of P adsorbed on per 1 g of titanium oxide, the appearance uniformity and adhesion of the forsterite film are improved.

Next, reasons for limitations on the features of the present disclosure will be explained. Note that in this specification, "%" indicating the content of each component element means "mass %" unless otherwise specified.

The content of B in magnesia is 0.05 mass % or more and 0.20 mass % or less.

When the content of B in magnesia is less than 0.05 mass %, sufficient film reactivity cannot be obtained in the high temperature range even in the presence of $TiO_2$. When the content is more than 0.20 mass %, B penetrates into the steel sheet and reacts with iron to form $Fe_2B$, which may deteriorate the repeated bending properties of a final steel sheet, or cause film defects such as point-like defects because the film reaction is partially over-promoted. The content of B in magnesia is preferably 0.06 mass % or more. The content of B in magnesia is preferably 0.18 mass % or less.

The content of P in magnesia is 0.01 mass % or more and 0.10 mass % or less.

When the content of P in magnesia is less than 0.01 mass %, the effect of promoting the solid-phase reaction between MgO and $TiO_2$ by P is not exhibited, and the appearance uniformity and adhesion of the film are deteriorated. On the other hand, when the content of P is more than 0.10 mass %, self-sintering of MgO is promoted, the reactivity of MgO is lowered before it reacts with $SiO_2$, and the appearance uniformity of the film is deteriorated, which is unsuitable. The content of P in magnesia is preferably 0.015 mass % or more in terms of P. The content of P in magnesia is preferably is 0.080 mass % or less.

In the present disclosure, the amount of the magnesia blended in the annealing separator is preferably 80 mass % or more. The amount of the magnesia blended in the annealing separator is more preferably 85 mass % or more.

When a large amount of $PO_4^-$ ions is present in an annealing separator slurry, P may be adsorbed on the surface of titanium oxide to reduce the surface activity of titanium oxide. In the present disclosure, containing P in magnesia reduces the amount of $PO_4^-$ ions eluted in the slurry, which prevents a decrease in the surface activity of titanium oxide. Even if P is contained in magnesia, when a large amount of $PO_4^-$ ions is eluted into the slurry, P may be adsorbed on the surface of titanium oxide to reduce the surface activity of titanium oxide. Therefore, the amount of P in magnesia eluted in boiling water is preferably 0.10 mg/L or less in terms of $PO_4^-$ ion in an extract. The amount of P in magnesia eluted in boiling water can be controlled by appropriately adjusting the firing temperature and firing time of magnesia.

The amount of P in magnesia eluted in boiling water is analyzed as follows. First, 1 g of magnesia is weighed and put into 50 mL of boiling pure water, and the solution was extracted for 5 minutes. The amount of $PO_4^-$ ions in the extract is measured by ICP emission spectrometry (ICP-AES) or ion chromatography.

The total amount of one or more types of alkali metals in titanium oxide is 0.0050 mass % or more and 0.50 mass % or less.

When the total amount of one or more types of alkali metals in titanium oxide is more than 0.50 mass %, the film reaction is over-promoted because the effect of promoting the solid-phase reaction between MgO and $TiO_2$ by P in magnesia and the effect of promoting the solid-phase reaction between MgO and $TiO_2$ by alkali metal are added together, which causes film defects such as point-like defects. On the other hand, when the total amount is less than 0.0050 mass %, the effect of promoting the solid-phase reaction between MgO and $TiO_2$ by alkali metal cannot be sufficiently obtained. Therefore, the total amount of one or more types of alkali metals in titanium oxide is 0.0050 mass % or more and 0.50 mass % or less. The total amount of one or more types of alkali metals in titanium oxide is preferably 0.0050 mass % or more and 0.40 mass % or less. The alkali metal may be, for example, one or more selected from the group consisting of Li, Na, K, Rb, Cs, and Fr. Additionally, the ionic radius of the alkali metal affects the solid-phase reaction promoting effect. From the viewpoint of having a preferable ionic radius with which a suitable solid-phase reaction promoting effect can be obtained and the viewpoint of controlling the film reaction, it is preferable to select and use one or two of Na and K among alkali metals.

In the present disclosure, the total amount of one or more types of alkali metals in titanium oxide can be quantified by pressurized acid decomposition-ICP emission spectrometry.

The amount of P adsorbed on titanium oxide is $1.5 \times 10^{-4}$ g or more and $1.0 \times 10^{-3}$ g or less in terms of P per 1 g of titanium oxide.

When the amount of P adsorbed on titanium oxide is less than $1.5 \times 10^{-4}$ g, the effect of promoting the solid-phase reaction between MgO and $TiO_2$ by P in magnesia is not exhibited, which is unsuitable. On the other hand, when the amount of P adsorption is more than $1.0 \times 10^{-3}$ g, the solid-phase reaction between MgO and $TiO_2$ occurs preferentially, and the solid-phase reaction between MgO and $SiO_2$ is suppressed, which is unsuitable. The amount of P adsorbed on titanium oxide is preferably $2.0 \times 10^{-4}$ g or more in terms of P per 1 g of titanium oxide. The amount of P adsorbed on titanium oxide is preferably $8.0 \times 10^{-4}$ g or less.

In the present disclosure, the amount of P adsorbed on titanium oxide is measured as follows.

First, the titanium oxide is immersed in an aqueous solution of 5 mass % orthophosphoric acid ($H_3PO_4$) for 5 minutes and then filtered and washed with water. The sample after being washed with water is alkali-melted and then acid decomposed. The sample after acid decomposition is analyzed by an ICP emission spectrometer, and the amount of P adsorbed on per 1 g of titanium oxide is calculated from the increase in the amount of P in the sample after the immersion in the aqueous solution of phosphoric acid as compared with the amount of P before the immersion.

The amount of titanium oxide blended in the annealing separator is 1.0 part by mass or more and 10 parts by mass or less per 100 parts by mass of magnesia.

When the amount of titanium oxide blended is less than 1.0 part by mass, the effect of promoting the film reaction cannot be obtained. When the amount of titanium oxide blended is more than 10 parts by mass, Ti penetrates into the steel to cause magnetic defects or form black point-like defects on the film, which is unsuitable. The amount of titanium oxide blended in the annealing separator is preferably 3.0 parts by mass or more per 100 parts by mass of magnesia. The amount of titanium oxide blended in the annealing separator is preferably 9.0 parts by mass or less per 100 parts by mass of magnesia.

Known examples of crystal forms of $TiO_2$ include anatase type, rutile type and brookite type. In the present disclosure, anatase-type $TiO_2$ is preferred. This is because, although both anatase-type and brookite-type $TiO_2$ improve the solid-phase reactivity between MgO and $TiO_2$ by straining the crystal when it changes to a rutile type at high temperatures, the transition temperature of the anatase type is about 900° C., which is higher than the transition temperature of the rutile type and the brookite type, so that anatase-type $TiO_2$ enhances the solid-phase reactivity between MgO and $TiO_2$ more easily in the high temperature range.

The basic components of the annealing separator of the present disclosure have been described above. In addition to these basic components, Sr compounds, sulfates, borates, and the like may be added to the annealing separator as necessary.

Next, a method of producing the above-described annealing separator will be described.

Magnesia may be produced with a known method such as a method of firing magnesium hydroxide or a method of spray firing magnesium chloride (Aman method). At this time, the contents of B and P in the magnesia can be adjusted as specified above by adding a predetermined amount of B compounds and P compounds to the raw material. For example, in the method of firing magnesium hydroxide or the method of spray firing magnesium chloride, a predetermined amount of B compounds and P compounds, such as $H_3BO_3$ and $H_3PO_4$, may be added to the raw material before firing. In this way, the contents of B and P in the magnesia after firing can be adjusted as specified above.

Titanium oxide may be produced with a known production method such as a sulfuric acid method or a chlorine method. At this time, the content of alkali metals such as Na and K in the titanium oxide can be adjusted as specified above by adding a predetermined amount of alkali metal compounds such as NaOH or KOH to the raw material. For example, in a process of washing titanium hydroxide, which is obtained by a hydration reaction of titanium sulfate, with water in the sulfuric acid method, the content of alkali metals such as Na and K in the titanium oxide can be adjusted as specified above by adding a predetermined amount of alkali metal compounds such as NaOH or KOH to the washing water.

Further, the amount of P adsorbed on per 1 g of titanium oxide can be controlled by, for example, adjusting the firing temperature and firing time when firing titanium hydroxide to obtain $TiO_2$ in the sulfuric acid method. For example, the amount of P adsorbed on titanium oxide can be increased by performing firing at a relatively high temperature.

Titanium oxide can be blended with magnesia according to a known method. Further, an annealing separator slurry can be obtained by, for example, mixing magnesia and titanium oxide with water and stirring the mixture at a liquid temperature of 30° C. or lower, preferably 20° C. or lower, and more preferably 15° C. or lower for 5 minutes or longer. The content of hydrated water in the annealing separator slurry is 1.0% to 5.0%.

Next, a method of producing a grain-oriented electrical steel sheet of the present disclosure will be described.

The method of producing a grain-oriented electrical steel sheet of the present disclosure is a method where the above-described annealing separator is used as an annealing separator in a common method of producing a grain-oriented electrical steel sheet using an annealing separator.

First, a steel slab is produced according to a common production method. For example, a steel slab is produced by performing ingot casting or continuous casting using molten steel that has been adjusted to a predetermined chemical composition.

Next, the steel slab is subjected to hot rolling to obtain a hot-rolled steel sheet. For example, the steel slab is heated to 1200° C. or higher and then subjected to hot rolling. The reheating method may be a known method using, for example, a gas furnace, an induction heating furnace, or an electric furnace. The conditions of the hot rolling may be any conventionally known conditions, which are not particularly limited.

Next, the hot-rolled steel sheet is subjected to hot-rolled sheet annealing as necessary, then scale on the surface of the steel sheet is removed by, for example, pickling, and then the hot-rolled steel sheet is subjected to cold rolling either once, or twice or more with intermediate annealing performed therebetween to obtain a cold-rolled steel sheet with a final sheet thickness.

Next, the cold-rolled steel sheet is subjected to primary recrystallization annealing to obtain a primary recrystallized sheet. The primary recrystallization annealing may also serve as decarburization annealing.

Next, the above-described annealing separator is applied as a slurry on the surface of the primary recrystallized sheet. The amount of the annealing separator applied to the primary recrystallized sheet is not particularly limited, but it is preferably 10.0 g or more and 30.0 g or less per 1 $m^2$ of the surface of the primary recrystallized sheet on both sides. Note that the amount applied is the weight of the annealing separator slurry after it is applied and dried. When the amount of the annealing separator applied on both sides is 10.0 g or more per 1 $m^2$ of the surface of the primary recrystallized sheet, it is possible to suitably prevent the steel sheets from sticking together during final annealing. On the other hand, it is useless to apply more than 30.0 g per 1 $m^2$ of the surface of the primary recrystallized sheet on both sides from an economic point of view.

Next, the primary recrystallized sheet applied with the annealing separator is subjected to secondary recrystallization annealing to obtain a secondary recrystallized sheet. In the secondary recrystallization annealing, it is preferable to hold the primary recrystallized sheet in a temperature range of 800° C. or higher and 950° C. or lower for 5 hours or longer and 200 hours or shorter. This is because, in order to control the orientation of secondary recrystallized grains with high accuracy, it is preferable to hold the sheet in a temperature range in which secondary recrystallization progresses for a long time. When the holding temperature is lower than 800° C., secondary recrystallization does not occur. When the holding temperature is higher than 950° C., the growth rate of secondary recrystallized grains is too fast to control the orientation. When the holding time is shorter than 5 hours, secondary recrystallization is not completed. When the holding time is longer than 200 hours, the shape of the coil may be deteriorated due to high temperature creep phenomenon, which is unsuitable. It is more preferable to hold the primary recrystallized sheet in a temperature range of 850° C. or higher and 950° C. or lower for 20 hours or longer and 100 hours or shorter.

Note that in the present specification, being held in a predetermined temperature range for a predetermined time not only means being held isothermally at a predetermined temperature, but also includes being held for a predetermined time while changing the temperature within a predetermined temperature range. Therefore, for example, a process of raising the temperature up to a temperature range of the purification annealing described later may also serve as the secondary recrystallization annealing described above. For example, in a process of raising the temperature of the primary recrystallized sheet that has been applied with the annealing separator to about 1200° C., the heating rate from 800° C. to 950° C. is set to 0.75° C./h or more and 30° C./h or less, and then the holding time in the temperature range of 800° C. to 950° C. can be set to 5 hours or longer and 200 hours or shorter.

After the secondary recrystallization annealing, the secondary recrystallized sheet is subjected to purification annealing. The purification annealing may be performed with a known method. For example, the secondary recrystallized sheet may be held at a high temperature of about 1200° C. for 3 hours or longer.

EXAMPLES

Example 1

[Preparation of Annealing Separator]

Magnesium hydroxide was added with $H_3BO_3$ and $H_3PO_4$, and the mixture was fired at 850° C. for 30 minutes to prepare magnesia. The contents of B and P in the magnesia were as listed in Table 1.

Titanium oxide was prepared with a sulfuric acid method. At this time, a predetermined amount of NaOH and KOH were added respectively to the washing water in the process where titanium hydroxide formed by a hydration reaction of titanium sulfate was washed with water as described above. After being washed with water, the titanium hydroxide cake was fired at 580° C. to 750° C. for 0.5 hours to 2.0 hours to prepare titanium oxide. The contents of Na and K in the prepared titanium oxide and the amount of P adsorbed on per 1 g of titanium oxide were as listed in Table 1. All the $TiO_2$ in titanium oxide was anatase-type $TiO_2$.

The prepared titanium oxide was blended in the amount listed in Table 1 per 100 parts by mass of magnesia to obtain an annealing separator. The annealing separator was mixed with water, and the mixture was stirred at a liquid temperature of 20° C. or lower for 5 minutes or longer to obtain an annealing separator slurry. The content of hydrated water in the annealing separator slurry was 2.5% to 4.5%.

[Production of Grain-Oriented Electrical Steel Sheet]

A steel slab containing C: 0.050%, Si: 3.40%, Mn: 0.070%, Al: 85 ppm, N: 40 ppm and S: 20 ppm, with the balance being Fe and inevitable impurities, was subjected to slab heating at 1200° C. for 60 minutes and then to hot rolling to obtain a sheet thickness of 2.2 mm, thereby obtaining a hot-rolled sheet. The hot-rolled sheet was coiled by a coiler to obtain a hot-rolled sheet coil. The hot-rolled sheet coil was subjected to hot-rolled sheet annealing at 1000° C. for 30 seconds. After the hot-rolled sheet annealing, scale on the surface of the steel sheet was removed. Next, cold rolling was performed using a tandem mill to obtain a final cold rolled sheet thickness of 0.20 mm. Next, primary recrystallization annealing was performed at a soaking temperature of 850° C. for 90 seconds to obtain a primary recrystallized sheet.

Next, the annealing separator prepared as described above was made into a slurry, applied on the primary recrystallized sheet on both sides in an amount of 20 g per 1 $m^2$ of the steel sheet and dried, and then the steel sheet was coiled into a coil. The coil was subjected to secondary recrystallization annealing where the temperature was raised to 1200° C. at 10° C./h to obtain a secondary recrystallized sheet. The secondary recrystallized sheet was then subjected to purification annealing at 1200° C. for 10 hours. Next, it was annealed for smoothing at 850° C. for 30 seconds to obtain a grain-oriented electrical steel sheet.

The appearance uniformity and adhesion of the forsterite film of the obtained grain-oriented electrical steel sheet were evaluated. The appearance uniformity of the film was evaluated visually. When the total length of pattern (ununiformity of color tone of the film) or defect was 5% or more of the total length of the coil, it was judged as "poor"; when the total length of pattern or defect was less than 5% and 3% or more, it was judged as "good"; when the total length of pattern or defect was less than 3%, it was judged as "excellent". The adhesion of the film was judged by coiling steel sheets that had been sheared to a width of 30 mm and a length of 280 mm around the surfaces of 12 round bars with different diameters in 5 mm increments from 60 mm to 5 mm in diameter, and determining the minimum diameter that did not cause defect or peeling in the film. When the minimum diameter at which peeling occurred was 35 mm or more, it was judged as "poor"; when the minimum diameter was 30 mm or less and more than 20 mm, it was judged as "fair"; when the minimum diameter was 20 mm or less and more than 15 mm, it was judged as "good"; when the minimum diameter was 15 mm or less, it was judged as "excellent". When the judgment is "good" or "excellent" for the appearance uniformity or the adhesion of the film, it can be said that the appearance uniformity or the adhesion of the film is excellent. The evaluation results are listed in Table 1.

TABLE 1

Chemical composition and evaluation results of annealing separator used in Example 1

| | Magnesia | | Titanium oxide | | | | | Evaluation | | |
|---|---|---|---|---|---|---|---|---|---|---|
| No | B (mass %) | P (mass %) | Amount of titanium oxide blended (part by mass) | Na (mass %) | K (mass %) | Na + K (mass %) | Amount of P adsorption ($\times 10^{-4}$ g) | Appearance uniformity of film | Adhesion (mm) | Remarks |
| 1 | 0.02 | 0.010 | 3.0 | 0.003 | 0.005 | 0.008 | 1.50 | Poor | 50 | Comparative Example |
| 2 | 0.05 | 0.025 | 0.0 | | | | | Poor | 50 | Comparative Example |
| 3 | 0.05 | 0.025 | 1.0 | 0.003 | 0.005 | 0.008 | 1.50 | Good | 30 | Example |
| 4 | 0.05 | 0.010 | 4.5 | 0.030 | 0.045 | 0.075 | 2.00 | Excellent | 15 | Example |
| 5 | 0.05 | 0.050 | 10.0 | 0.030 | 0.045 | 0.075 | 2.00 | Good | 20 | Example |
| 6 | 0.10 | 0.008 | 3.0 | 0.200 | 0.300 | 0.500 | 5.00 | Poor | 40 | Comparative Example |
| 7 | 0.10 | 0.020 | 3.0 | 0.200 | 0.300 | 0.500 | 5.00 | Good | 30 | Example |
| 8 | 0.10 | 0.020 | 6.0 | 0.020 | 0.030 | 0.050 | 4.00 | Good | 30 | Example |
| 9 | 0.10 | 0.020 | 15.0 | 0.020 | 0.030 | 0.050 | 4.00 | Poor | 15 | Comparative Example |
| 10 | 0.10 | 0.020 | 5.0 | 0.100 | 0.075 | 0.175 | 10.00 | Good | 30 | Example |

TABLE 1-continued

Chemical composition and evaluation results of annealing separator used in Example 1

| | Magnesia | | Titanium oxide | | | | | Evaluation | | |
|---|---|---|---|---|---|---|---|---|---|---|
| No | B (mass %) | P (mass %) | Amount of titanium oxide blended (part by mass) | Na (mass %) | K (mass %) | Na + K (mass %) | Amount of P adsorption ($\times 10^{-4}$ g) | Appearance uniformity of film | Adhesion (mm) | Remarks |
| 11 | 0.10 | 0.020 | 8.0 | 0.020 | 0.050 | 0.070 | <u>15.0</u> | Poor | 40 | Comparative Example |
| 12 | 0.15 | 0.050 | 9.0 | 0.070 | 0.150 | 0.220 | <u>8.00</u> | Good | 30 | Example |
| 13 | 0.15 | 0.100 | 9.0 | 0.035 | 0.120 | 0.155 | 8.00 | Good | 15 | Example |
| 14 | 0.15 | 0.100 | 9.0 | 0.250 | 0.450 | <u>0.700</u> | 2.00 | Poor | 15 | Comparative Example |
| 15 | 0.15 | 0.025 | <u>0.0</u> | | | | | Poor | 40 | Comparative Example |
| 16 | 0.15 | <u>0.150</u> | <u>3.0</u> | 0.035 | 0.120 | 0.155 | 8.00 | Poor | 30 | Comparative Example |
| 17 | 0.20 | <u>0.080</u> | 8.0 | 0.010 | 0.020 | 0.030 | <u>1.00</u> | Poor | 50 | Comparative Example |
| 18 | 0.20 | 0.080 | 6.0 | 0.035 | 0.120 | 0.155 | <u>8.00</u> | Good | 20 | Example |
| 19 | <u>0.25</u> | 0.080 | 9.0 | 0.030 | 0.045 | 0.075 | 2.00 | Poor | 30 | Comparative Example |

*Those outside the suitable range of the present disclosure are underlined

From Table 1, it can be seen that, by applying an annealing separator in which the contents of B and P in magnesia, the total amount of one or more types of alkali metals in titanium oxide, the amount of P adsorbed on per 1 g of titanium oxide, and the amount of titanium oxide blended with magnesia are as specified in the present disclosure, it is possible to obtain a grain-oriented electrical steel sheet having a film with excellent appearance uniformity and adhesion.

Example 2

[Preparation of Annealing Separator]

Magnesium hydroxide was added with $H_3BO_3$ and $H_3PO_4$, and the mixture was fired at 800° C. for 0.7 hours to prepare magnesia. The contents of B and P in the magnesia were as listed in Table 2.

Titanium oxide was prepared with a sulfuric acid method. At this time, a predetermined amount of NaOH and KOH were added respectively to the washing water in the process where titanium hydroxide formed by a hydration reaction of titanium sulfate was washed with water. After being washed with water, the titanium hydroxide cake was fired under Condition A, that is, fired at 700° C. for 0.5 hours, to obtain titanium oxide containing anatase-type $TiO_2$ with an amount of P adsorption of $2.5 \times 10^{-4}$ g (indicated as type "A" of titanium oxide in Table 2). Additionally, after being washed with water, the titanium hydroxide cake was fired under Condition R, that is, fired at 950° C. for 0.3 hours, to obtain titanium oxide containing rutile-type $TiO_2$ with an amount of P adsorption of $8.0 \times 10^{-4}$ g (indicated as type "R" of titanium oxide in Table 2). In both cases of the anatase-type $TiO_2$ and the rutile-type $TiO_2$, the content of Na in the titanium oxide was 0.0030 mass %, and the content of K in the titanium oxide was 0.0100 mass %.

The prepared titanium oxide was blended in the amount listed in Table 2 per 100 parts by weight of magnesia to prepare an annealing separator. The annealing separator was mixed with water, and the mixture was stirred at a liquid temperature of 15° C. or lower for 15 minutes or longer to obtain an annealing separator slurry. The content of hydrated water in the annealing separator slurry was 1.0% to 2.0%.

[Production of Grain-Oriented Electrical Steel Sheet]

A steel slab containing C: 0.050%, Si: 3.45%, Mn: 0.070%, Al: 120 ppm, N: 50 ppm, S: 20 ppm, Sb: 0.015% and Cr: 0.03%, with the balance being Fe and inevitable impurities, was subjected to slab heating at 1350° C. for 40 minutes and then to hot rolling to obtain a sheet thickness of 2.2 mm, thereby obtaining a hot-rolled sheet. The hot-rolled sheet was coiled by a coiler to obtain a hot-rolled sheet coil. The hot-rolled sheet coil was subjected to hot-rolled sheet annealing at 900° C. for 60 seconds. After the hot-rolled sheet annealing, scale on the steel sheet surface was removed. Next, the steel sheet was subjected to cold rolling with intermediate annealing at 1050° C. for 60 seconds performed therebetween, to obtain a final cold rolled sheet thickness of 0.18 mm. Next, primary recrystallization annealing was performed at a soaking temperature of 850° C. for 90 seconds to obtain a primary recrystallized sheet.

The annealing separator was applied on the primary recrystallized sheet on both sides in an amount of 10 g per 1 m² of the steel sheet and dried. Next, the steel sheet was subjected to secondary recrystallization annealing where the temperature was raised from 850° C. to 950° C. at 2° C./h to obtain a secondary recrystallized sheet. Next, the temperature of the secondary recrystallized sheet was raised from 950° C. to 1200° C. at 30° C./h. Next, after performing purification annealing at 1200° C. for 15 hours, the steel sheet was annealed for smoothing at 900° C. for 15 seconds to obtain a grain-oriented electrical steel sheet.

With respect to the obtained grain-oriented electrical steel sheet, the appearance uniformity and adhesion of the forsterite film were evaluated based on the same criteria as in Example 1. The evaluation results are listed in Table 2.

TABLE 2

Chemical composition and evaluation results of annealing separator used in Example 2

| | Magnesia | | Titanium oxide | | Evaluation | | |
|---|---|---|---|---|---|---|---|
| No | B (mass %) | P (mass %) | Type | Amount of titanium oxide blended (part by mass) | Appearance uniformity of film | Adhesion (mm) | Remarks |
| 1 | 0.02 | 0.010 | A | 3.0 | Poor | 50 | Comparative Example |
| 2 | 0.05 | 0.010 | A | 2.0 | Good | 30 | Example |
| 3 | 0.06 | 0.015 | A | 0.5 | Poor | 50 | Comparative Example |
| 4 | 0.06 | 0.020 | R | 0.5 | Poor | 60 | Comparative Example |
| 5 | 0.10 | 0.080 | A | 3.0 | Excellent | 15 | Example |
| 6 | 0.10 | 0.008 | A | 3.0 | Poor | 50 | Comparative Example |
| 7 | 0.10 | 0.100 | A | 5.0 | Good | 25 | Example |
| 8 | 0.10 | 0.025 | R | 5.0 | Good | 25 | Example |
| 9 | 0.15 | 0.025 | A | 3.0 | Excellent | 15 | Example |
| 10 | 0.15 | 0.025 | R | 3.0 | Excellent | 25 | Example |
| 11 | 0.18 | 0.025 | A | 3.0 | Excellent | 15 | Example |
| 12 | 0.18 | 0.025 | A | 7.0 | Excellent | 10 | Example |
| 13 | 0.18 | 0.025 | R | 7.0 | Excellent | 20 | Example |
| 14 | 0.20 | 0.025 | A | 3.0 | Good | 30 | Example |
| 15 | 0.20 | 0.025 | A | 9.0 | Excellent | 30 | Example |
| 16 | 0.20 | 0.150 | A | 9.0 | Poor | 30 | Comparative Example |
| 17 | 0.25 | 0.080 | A | 3.0 | Poor | 20 | Comparative Example |
| 18 | 0.25 | 0.080 | R | 5.0 | Poor | 30 | Comparative Example |

*Those outside the suitable range of the present disclosure are underlined.

From Table 2, it can be seen that, by applying the annealing separator of the present disclosure, it is possible to obtain a grain-oriented electrical steel sheet having a film with excellent appearance uniformity and adhesion. Additionally, it can be seen that anatase-type titanium oxide exhibits better properties than rutile-type titanium oxide.

The invention claimed is:

1. An annealing separator for grain-oriented electrical steel sheet, comprising:
   magnesia that contains 0.05 mass % or more and 0.20 mass % or less of B and 0.01 mass % or more and 0.10 mass % or less of P and is mainly composed of MgO, and
   titanium oxide in 1.0 part by mass or more and 10.0 parts by mass or less per 100 parts by mass of the magnesia, where the titanium oxide contains one or more alkali metals in a total amount of 0.0050 mass % or more and 0.50 mass % or less and is mainly composed of $TiO_2$, wherein
   an amount of P adsorbed on the titanium oxide per 1 g of the titanium oxide is $1.5 \times 10^{-4}$ g or more and $1.0 \times 10^{-3}$ g or less.

2. The annealing separator for grain-oriented electrical steel sheet according to claim 1, wherein the $TiO_2$ is anatase $TiO_2$.

3. A method of producing a grain-oriented electrical steel sheet, comprising
   subjecting a steel slab to hot rolling to obtain a hot-rolled steel sheet,
   subjecting the hot-rolled steel sheet to cold rolling either once, or twice or more with intermediate annealing performed therebetween to obtain a cold-rolled steel sheet with a final sheet thickness,
   then subjecting the cold-rolled steel sheet to primary recrystallization annealing to obtain a primary recrystallized sheet, and
   then an annealing separator is applied to a surface of the primary recrystallized sheet, and then the primary recrystallized sheet is subjected to secondary recrystallization annealing to obtain a secondary recrystallized sheet, wherein
   the annealing separator is the annealing separator according to claim 1.

4. The method of producing a grain-oriented electrical steel sheet according to claim 3, wherein in the secondary recrystallization annealing, the sheet is held in a temperature range of 800° C. or higher and 950° C. or lower for 5 hours or longer and 200 hours or shorter.

5. A method of producing a grain-oriented electrical steel sheet, comprising
   subjecting a steel slab to hot rolling to obtain a hot-rolled steel sheet,
   subjecting the hot-rolled steel sheet to cold rolling either once, or twice or more with intermediate annealing performed therebetween to obtain a cold-rolled steel sheet with a final sheet thickness,
   then subjecting the cold-rolled steel sheet to primary recrystallization annealing to obtain a primary recrystallized sheet, and
   then an annealing separator is applied to a surface of the primary recrystallized sheet, and then the primary recrystallized sheet is subjected to secondary recrystallization annealing to obtain a secondary recrystallized sheet, wherein
   the annealing separator is the annealing separator according to claim 2.

6. The method of producing a grain-oriented electrical steel sheet according to claim 5, wherein in the secondary recrystallization annealing, the sheet is held in a temperature range of 800° C. or higher and 950° C. or lower for 5 hours or longer and 200 hours or shorter.

* * * * *